United States Patent
Nantz et al.

(10) Patent No.: US 6,888,446 B2
(45) Date of Patent: May 3, 2005

(54) TIRE PRESSURE MONITORING AUTO LOCATION ASSEMBLY

(75) Inventors: John Nantz, Brighton, MI (US); Riad Ghabra, Dearborn Heights, MI (US); Tom Tang, Novi, MI (US); Ronald King, Brownstown, MI (US); Thomas LeMense, Farmington, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/248,856

(22) Filed: Feb. 25, 2003

(65) Prior Publication Data

US 2004/0164854 A1 Aug. 26, 2004

(51) Int. Cl.[7] .................................... B60Q 1/26
(52) U.S. Cl. ............... 340/433; 442/446; 442/539.13; 442/539.23
(58) Field of Search ................ 340/539.1, 539.13, 340/539.21, 539.23, 443, 442, 444, 445, 539.11; 73/146.5

(56) References Cited

U.S. PATENT DOCUMENTS

| | | | |
|---|---|---|---|
| 6,034,597 A | | 3/2000 | Normann et al. |
| 6,181,241 B1 | | 1/2001 | Normann et al. |
| 6,340,930 B1 | * | 1/2002 | Lin ........................... 340/447 |
| 6,362,731 B1 | | 3/2002 | Lill |
| 6,369,703 B1 | | 4/2002 | Lill |
| 6,385,511 B1 | * | 5/2002 | Fondeur et al. ............... 701/1 |
| 6,417,766 B1 | | 7/2002 | Starkey |
| 6,420,967 B1 | | 7/2002 | Ghabra et al. |
| 6,434,470 B1 | | 8/2002 | Nantz et al. |
| 6,435,020 B1 | | 8/2002 | Oldenettel et al. |
| 6,439,044 B1 | | 8/2002 | Tigges |
| 6,446,502 B1 | | 9/2002 | Normann et al. |
| 6,448,892 B1 | | 9/2002 | Delaporte |
| 6,453,737 B2 | | 9/2002 | Young et al. |
| 6,463,799 B1 | | 10/2002 | Oldenettel et al. |
| 6,476,712 B1 | | 11/2002 | Achterholt |
| 6,486,773 B1 | | 11/2002 | Bailie et al. |
| 6,489,888 B1 | * | 12/2002 | Honeck et al. ............. 340/442 |
| 6,499,343 B1 | | 12/2002 | Haas et al. |

\* cited by examiner

*Primary Examiner*—Davetta W. Goins
(74) *Attorney, Agent, or Firm*—Bill Panagos, Esq.

(57) ABSTRACT

An automotive tire pressure monitoring assembly 10 for installation in a vehicle 12 is provided. The automotive tire pressure monitoring assembly 10 includes at least one tire pressure sensor 34 generating a signal based on the pressure of air within a tire 14. The at least one tire pressure sensor 34 further includes a sensor receiver 68 in communication with a sensor control logic 38. The sensor control logic 38 is adapted to receive spectral noise 20 from at least one noise generating assembly 18. The automotive tire pressure monitoring assembly 10 further includes a controller assembly 52 positioned within the vehicle 12 and in remote communication with the at least one tire pressure sensor 34. The automotive tire pressure monitoring assembly 10 includes a positioning logic adapted to determine the position of the at least one tire pressure sensor 34 based on the strength of the spectral noise 20.

20 Claims, 1 Drawing Sheet

TIRE PRESSURE MONITORING AUTO LOCATION ASSEMBLY

BACKGROUND OF INVENTION

The present invention relates generally to an automotive tire pressure monitoring method and assembly and more specifically to an automotive tire pressure monitoring method and assembly with auto-location features.

Modern automotive performance relies on a plurality of individual vehicle components operating together. Although present vehicles often include new and increasingly complex components, many traditional components remain as crucial parameters in the vehicles operation. Such is the case with vehicle tire pressure. The air pressure within vehicle tires plays a vital role in tire performance and thereby effects proper vehicle operation. Interaction between a vehicle and its tires can effect handling, braking, rollover, and other operational characteristics. Excess tire pressure can negatively impact performance and may increase susceptibility to puncture. Low tire pressure can negatively impact performance, increase wear, and may generate excess heat. It is therefore common for automotive tires to be designed for operation within a range of tire pressures based on tire type, vehicle type, vehicle configuration and use, and driving conditions.

In light of the role that tire pressure plays in vehicle performance, considerable desire has existed for keeping automotive tires within their preferred range of tire pressures. It is known that tires often lose air pressure during operation of the vehicle. Tire pressure is often lost gradually, making the point at which inflation pressure drops below the desired pressure range difficult to detect. Manually operated tire pressure gauges are often unreliable and inaccurate. Furthermore, the time and effort required for consumers to actively monitor their tire pressure using such manually operated gauges often renders them unused. It is therefore known that remote sensors may be placed inside the individual tires, or in communication with the valve stems, such that the tire pressure of each tire can be automatically relayed to the passenger compartment without the need of manual gauges.

In-vehicle tire-pressure monitoring systems often present considerable design challenges to automotive designers. Many known systems monitor tire pressures without regard to the individual identity or location of the tire whose pressure has varied from the preferred range. Thus when a tire varies in such a fashion, the operator is warned of a low tire pressure but must still utilize a manual gauge to locate and adjust the offending tire. Other systems associate a reported tire pressure with the i.d. of the sensor and therefore can provide both value and location information. These systems, however, are susceptible to commonplace automotive maintenance procedures such as tire rotation and replacement. As tire replacement or rotations are performed, the location of the pressure sensors may no longer conform to the indicated location of the tire pressure as indicated by the monitoring system.

Present approaches to accommodating the addition and rotation of tires utilize various forms of learning to determine the location of each transmitter/tire. Manual learning interfaces often require extensive customer interfaces in order to teach the receiver module the location of new or displaced sensor ids. This methodology requires undesirable customer effort and may be prone to errors. Automated learning interfaces eliminate both effort and error factors, but presently do so at the expense of undesirably added cost and weight. One approach utilizes low frequency transmitters mounted in each wheel well of the vehicle. These transmitters trigger the individual wheel mounted sensors. The receiver module is then used to associate a tire/transmitter id with a vehicle location by triggering each location and capturing the data received. This is an expensive solution and adds additional weight to the vehicle by positioning a transmitter in each wheel well.

It would therefore be highly desirable to have an automotive tire pressure monitoring assembly that eliminated the effort and error associated with manual learning interfaces. It would further be highly desirable to develop an automotive pressure monitoring assembly with that reduced the cost and weight associated with existing automated learning interfaces.

SUMMARY OF INVENTION

It is therefore an object to the present invention to provide an automotive tire pressure monitoring assembly with reduced effort and error. It is further object to the present invention to provide an automotive tire pressure monitoring assembly with reduced cost and weight properties.

In accordance with the objects of the present invention an automotive tire pressure monitoring assembly for installation in a vehicle is provided. The automotive tire pressure monitoring assembly includes at least one tire pressure sensor generating a signal based on the pressure of air within a tire. The tire pressure sensor further includes a transmitter and a receiver in communication with a sensor control logic. The sensor control logic is adapted to receive spectral noise from noise generating systems present within the automobile. The automotive tire pressure monitoring assembly further includes a controller assembly positioned within the automobile and in remote communication with the at least one tire pressure sensor. The automotive tire pressure monitoring assembly further includes a positioning logic adapted to determine the position of the at least one tire pressure sensor based on the strength of the spectral noise.

Other objects and features of the present invention will become apparent when viewed in light of the detailed description and preferred embodiment when taken in conjunction with the attached drawings and claims.

DETAILED DESCRIPTION

Figure 1:
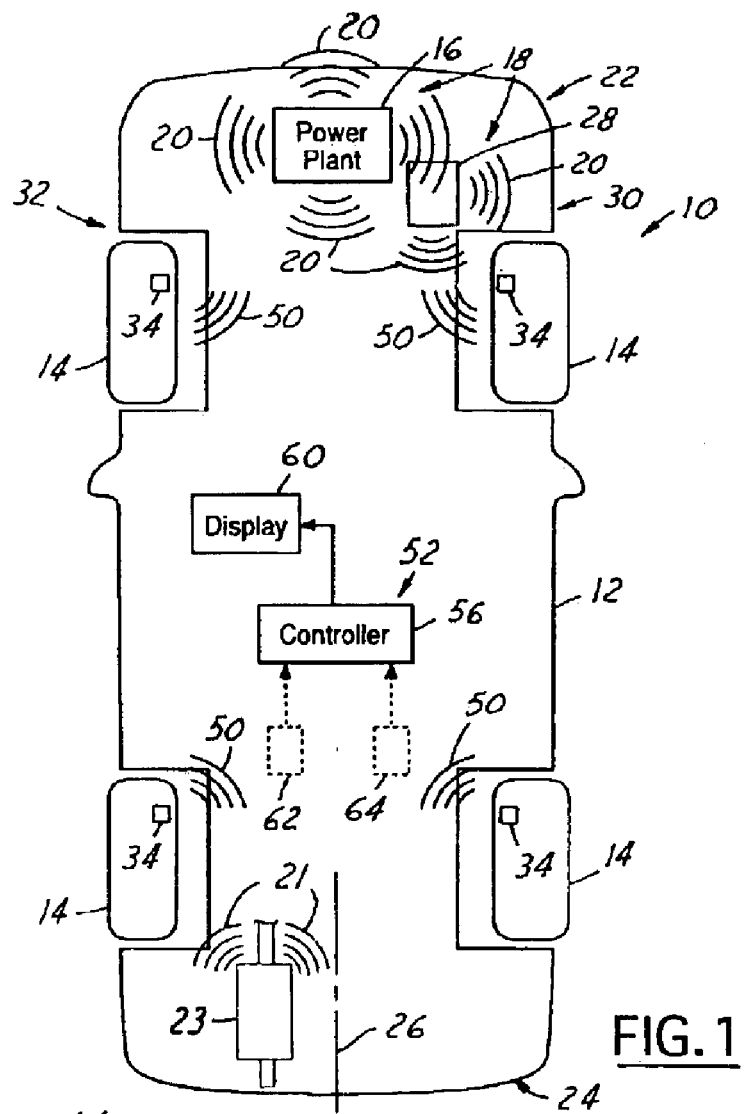
FIG. 1 is an illustration of an automotive tire pressure monitoring assembly in accordance with the present invention.

Referring now to FIG. 1, which is an illustration of an automotive tire pressure monitoring assembly 10 for use with the present invention. The automotive tire pressure monitoring assembly 10 is illustrated mounted within a vehicle 12. It is contemplated that the present invention may be utilized within a wide variety of vehicles 12 and in a wide variety of configurations. The vehicle 12 includes one or more tires 14 utilized in conjunction with a vehicle engine 16 to impart kinetic motion to the vehicle 12.

It is known that the vehicle engine/power plant 16 is one of a plurality of primary function components within an automobile that can be considered noise generating systems 18. When the vehicle engine 16 is started, a variety of noise generating systems 18 begin running simultaneously. These include, but are not limited to, charging systems, ignition systems, and switching power supplies. These systems radiate a lot of spectral noise 20 when running. It should be understood that spectral noise 20 is intended to encompass a wide variety of variants of radiated noise. In one embodiment, it is contemplated that the spectral noise 20 is intended to include an electromagnetic transient field generated during vehicle startup. In other embodiments, however, the spectral noise 20 may comprise various other noise forms including sound waves 21 generated by the exhaust 23 or other sound generating components during startup or operation of the vehicle 12.

The spectral noise 20 generated by a given noise generating system 18 emanates from a position within the vehicle 12 relative to the location of the noise generating system 18. The strength of the spectral noise 20 will naturally diminish the farther away from the noise generating system 18 a reading is taken. Thus for a noise generating system 18 positioned in the fore portion 22 of the vehicle 12, the spectral noise 20 generated will be stronger in the fore portion 22 than the rear portion 24. Similarly, for a noise generating system 18 positioned off of the vehicle centerline 26 (asymmetrically positioned noise generating systems 28) the spectral noise 20 generated will be stronger in either the starboard portion 30 or the port portion 32 of the vehicle 12. An important advantage is that these noise generating systems 18 are primary function components. This means that their presence within the vehicle 12 is dictated by a function other than the claimed tire pressure monitoring assembly 10. Thus, the spectral noise 20 that these systems generate would be present within the vehicle 12 with or without the presence of a tire pressure monitoring assembly 10. The present invention, therefore, does not require the addition of costly and weight increasing systems to generate positional signals.

Figure 2:
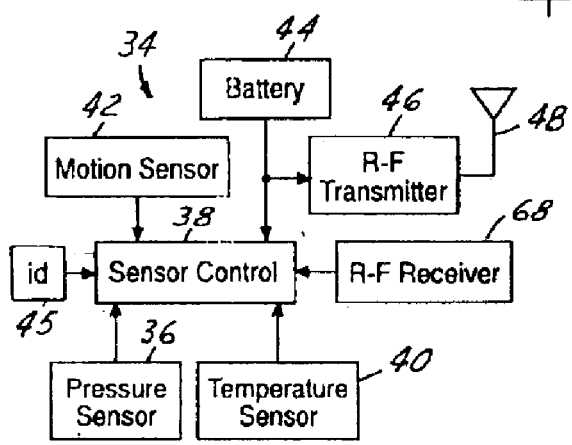
FIG. 2 is an illustration of a tire pressure sensor assembly for use in the automotive tire pressure monitoring assembly illustrated in FIG. 1.

The present invention takes advantage of these noise generating systems 18 in order to provide a low cost tire pressure monitoring system. The present invention does so by including at least one tire pressure sensor 34 preferably located within a tire 14 or attached to an inflation valve for the tire 14. The tire pressure sensor 34 measures the tire pressure within the tire through the use of a pressure sensor element 36 in communication with a sensor control 38 (sensor control logic) (see FIG. 2). The tire pressure sensor 34 may also measure one or more additional parameters associated with the tire 14 such as temperature using a tire temperature sensor 40 and motion using a motion sensor 42. A battery 44 allows the tire pressure sensor 34 to operate without the necessity of a hard-wired electrical communication to the vehicle 12. Finally, an id element 45 in communication with the sensor control 38 allows a plurality of tire pressure sensors 34 to be used in combination.

Figure 3:
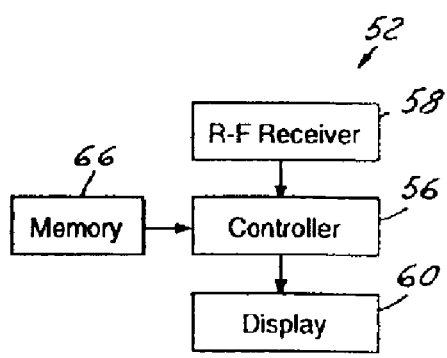
FIG. 3 is an illustration of a controller assembly for use in the automotive tire pressure monitoring assembly illustrated in FIG. 1.

When the tire pressure sensor 34 measures the tire pressure, a sensor transmitter 46, such as a RF-transmitter and antenna 48, may be utilized to communicate this information, by generating a sensor signal 50 (preferably an RF signal) (see FIG. 1), to a controller assembly 52 positioned within the automobile 12. The controller assembly 52 (see FIG. 3) includes a main controller 56 in communication with a controller receiver element 58. The controller assembly 52 can thereby receive the sensor signal 50 and communicate the tire pressure to the vehicle passengers by way of a display 60 in communication with the main controller 56. Information such as the tire temperature and id may also be transmitted via the sensor signal 50 in order to improve the accuracy of the tire pressure reading. Additionally, an ambient pressure sensor 62 and an ambient temperature sensor 64 may be placed in communication with the controller assembly 52 in order to further improve tire pressure accuracy (see FIG. 1). A memory element 66 may be utilized by the controller assembly 52 in order to retain periodically received sensor signal 50 values from a plurality of tire pressure sensors 34.

Although the sensor signal 50 may contain an id 45 such that a plurality of tire pressures may be reported by the controller assembly 52, further advancements must be incorporated into the present invention in order for the controller assembly to accurately report the corresponding position a given tire pressure. The present invention advances technology to accomplish this by adapting the sensor control logic 38 to receive spectral noise 20 from noise generating systems 18 present within the vehicle 12. Although this may be accomplished in a variety of fashions, one embodiment contemplates the use of a RSSI (receive signal strength indicator). RSSI functions are commonly utilized by remote sensors for diagnostic and programming functions. The present invention, however, utilizes this function in order to monitor changes in spectral noise level variations. The RSSI level will change with changes in environmental or spectral noise level variations. In this fashion, the present invention can utilize a sensor receiver 68 (see FIG. 2) in communication with the sensor control 38 to receive spectral noise 20 levels. In the described embodiment, the sensor receiver 68 may have additional functionality in the sensor assembly 36 such as the aforementioned diagnostic and programming functions. In other embodiments, however, the sensor receiver 68 may be designed specifically for receiving spectral noise 20. In still anther embodiment, the sensor control logic 38 may be adapted to receive spectral noise 20 by way of interference of the spectral noise 20 with the sensor transmitter 46. When the spectral noise 20 comprises audio sound waves 21 generated by components such as the exhaust 23, the sensor receiver 68 may simply comprise a simple transducer such has a piezo device or speaker.

The present invention further includes a positioning logic adapted to determine the position of the tire pressure sensor 34 relative to the vehicle 12. This is accomplished by way of the spectral noise 20 strength. Since spectral noise 20 strength is inversely proportional to the distance of the tire pressure sensor 34 from the noise generating system 18, the location of the tire pressure sensor 34 can be easily determined. By way of example, when the noise generating system 18 is positioned in the fore portion 22 of the vehicle 12 (such as the electromagnetic noise generated by the power plant on start-up) the positioning logic can determine if the tire pressure sensor 34 is positioned in the fore portion 22 of the vehicle 12. Similarly, in the example of an asymmetrically positioned noise generating system 28, the starboard 30 or port 32 position of the pressure sensor 34 can be determined. Although the positioning logic can be adapted to determine both starboard/port as well as fore/aft positioning based solely on spectral noise 20, it is contemplated that the positioning logic may optionally determine fore/aft positioning based on spectral noise 20 and starboard/port positioning based upon alternate data such as that provide by the motion sensor 42.

The positioning logic adapted to determine the position of the tire pressure, sensor 34 may be contained within the tire pressure sensor 34. Alternatively, the tire pressure sensor 34 may simply relay the spectral noise 20 strength to the controller assembly 52 wherein the positioning logic may be imbedded to process the data to determine sensor location. In either case, the position of a given tire pressure sensor 34 within the automobile 12 may be automatically determined without the need for individualized transmitters/receivers mounted in each wheel well. This provides potential cost as well as weight savings to a vehicle design.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An automotive tire pressure monitoring assembly (10) for use in an automobile (12) including at least one noise generating assembly (12) actively radiating a spectral noise signal comprising:
    at least one tire pressure sensor (34) generating a pressure signal (50) based on the pressure of air within a tire (14), said tire pressure sensor (34) including a sensor receiver (68) in communication with a sensor control logic (38), said sensor control logic (38) adapted to receive the spectral noise signal (20) from the at least one noise generating assembly (18);
    a controller assembly (52) positioned within the automobile (12) and in remote communication with said at least one tire pressure sensor (34); and
    a positioning logic adapted to determine the position of said at least one tire pressure sensor (34) based on the strength of the spectral noise signal (20).

2. An automotive tire pressure monitoring assembly (10) as described in claim 1, wherein positioning logic is imbedded in said sensor control logic (38).

3. An automotive tire pressure monitoring assembly (10) as described in claim 1, wherein positioning logic is imbedded in said controller assembly (52).

4. An automotive tire pressure monitoring assembly (10) as described in claim 1, wherein said positioning logic determines the fore/aft position of said at least one tire pressure sensor (34).

5. An automotive tire pressure monitoring assembly (10) as described in claim 1, wherein said positioning logic determines the starboard/aft position of said at least one tire pressure sensor (34).

6. An automotive tire pressure monitoring assembly (10) as described in claim 1, further comprising:
    a display element (60) in communication with said controller assembly (52), said display element (60) communicating said position of said at least one tire pressure sensor (34) in addition to said pressure signal (50).

7. An automotive tire pressure monitoring assembly (10) as described in claim 4, further comprising:
    a motion sensor (42) in communication with said sensor control logic (38), said positioning logic adapted to determine the starboard/port position of said at least one tire pressure sensor (34) based on said motion sensor (42).

8. An automotive video display console assembly (10) as described in claim 1, wherein said sensor receiver (68) comprises a receive signal strength indicator.

9. A method of determining the pressure and position of a tire (14) on an automobile (12) comprising:
    sensing the air pressure in at least one tire (14);
    sensing the spectral noise signal (20) present at said at least one tire (14);
    determining the position of said at least one tire (14) based on the strength of said spectral noise signal (20).

10. A method of determining the pressure and position of a tire (14) on an automobile (12) as described in claim 9, wherein said position comprises a fore/aft location of said at least one tire (14).

11. A method of determining the pressure and position of a tire (14) on an automobile (12) as described in claim 9, wherein said position comprises a starboard/port location of said at least one tire (14).

12. A method of determining the pressure and position of a tire (14) on an automobile (12) as described in claim 9, wherein said spectral noise signal (20) comprises an electromagnetic transient field (20) generated by automotive startup systems (16).

13. A method of determining the pressure and position of a tire (14) on an automobile (12) as described in claim 9, wherein said spectral noise signal (20) comprises sound waves (21) generated by automotive exhaust systems (23).

14. A method of determining the pressure and position of a tire (14) on an automobile (12) as described in claim 9, further comprising:
    reporting said spectral noise signal (20) to a control assembly (52); and
    generating a position of said at least one tire (14) based on the strength of said spectral noise signal (20) within said control assembly (52).

15. A method of determining the pressure and position of a tire (14) on an automobile (12) as described in claim 9, further comprising:
    sensing the spectral noise signal (20) present at said at least one tire (14) using a diagnostic assembly formed as a portion of at least one tire pressure sensor (34) positioned within said at least one tire (14).

16. A method of determining the pressure and position of a tire (14) on an automobile (12) comprising:
    sensing the air pressure in at least one tire (14) utilizing at least one tire pressure sensor (34) positioned within said at least one tire (14);
    sensing the spectral noise signal (20) present at said at least one tire (14) using said at least one tire pressure sensor (34);
    transmitting said air pressure to a control assembly (52);
    determining the position of said at least one tire (14) based on the strength of said spectral noise (20);
    displaying said air pressure in combination with said position.

17. A method of determining the pressure and position of a tire (14) on an automobile (12) as described in claim 16, further comprising:
    transmitting said position to said control assembly (52).

18. A method of determining the pressure and position of a tire (14) on an automobile (12) as described in claim 16, further comprising:
    transmitting said spectral noise signal (20) to said control assembly (52); and
    accessing positioning logic embedded in said control assembly (52) to determine said position of said at least one tire (14).

19. A method of determining the pressure and position of a tire (14) on an automobile (12) as described in claim 16, wherein said spectral noise signal (20) comprises an electromagnetic transient field (20) generated by automotive startup systems (16).

20. A method of determining the pressure and position of a tire (14) on an automobile (12) as described in claim 16, wherein said position comprises a fore/aft location of said at least one tire (14).

* * * * *